C. O. BOLTON.
LEVEL AND PLUMB.
APPLICATION FILED MAR. 31, 1915.
1,186,272.
Patented June 6, 1916.
2 SHEETS—SHEET 1.
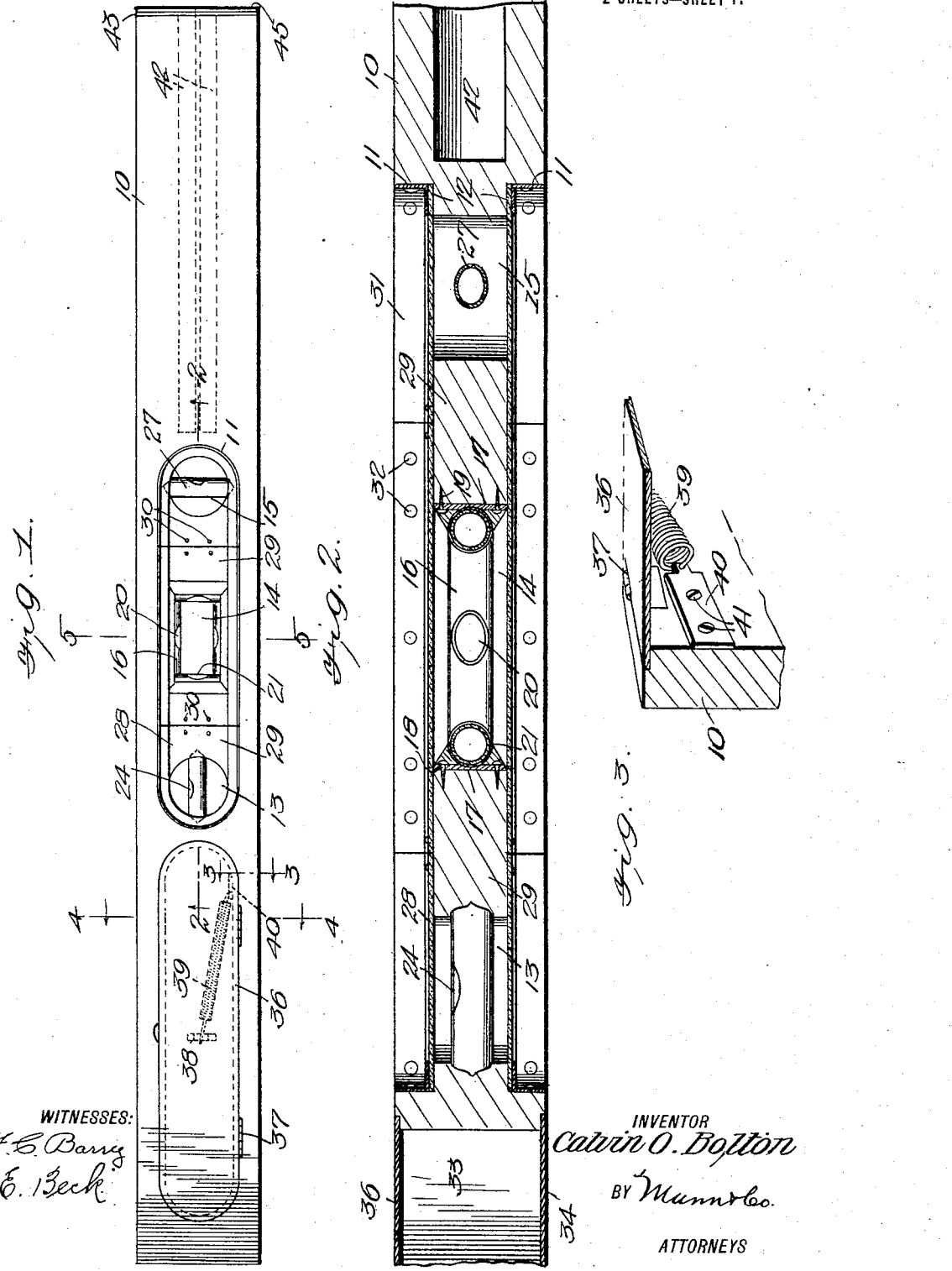
WITNESSES:
INVENTOR
Calvin O. Bolton
BY Munn & Co.
ATTORNEYS C. O. BOLTON.
LEVEL AND PLUMB.
APPLICATION FILED MAR. 31, 1915.
1,186,272.
Patented June 6, 1916.
2 SHEETS—SHEET 2.
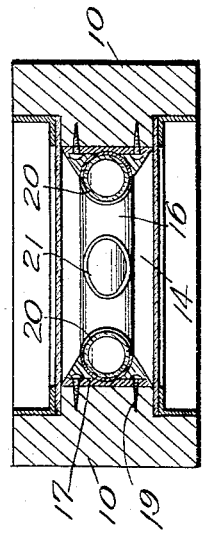
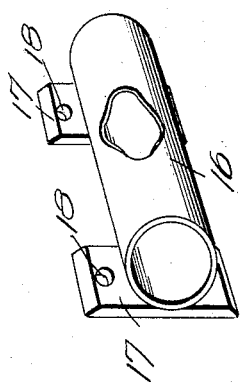
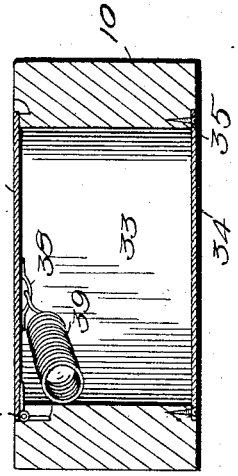
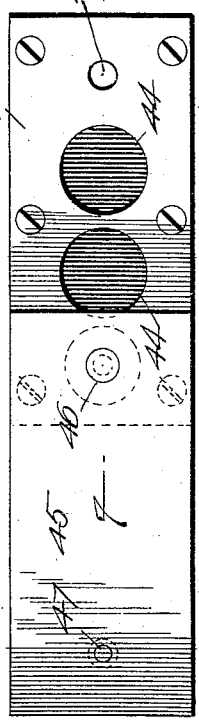
WITNESSES:
F. C. Barry
H. E. Beck
INVENTOR
Calvin O. Bolton
BY Munn & Co.
ATTORNEYS

UNITED STATES PATENT OFFICE.

CALVIN O. BOLTON, OF GRAND RAPIDS, MICHIGAN.

LEVEL AND PLUMB.

1,186,272.  Specification of Letters Patent.  Patented June 6, 1916.

Application filed March 31, 1915. Serial No. 18,270.

*To all whom it may concern:*

Be it known that I, CALVIN O. BOLTON, a citizen of the United States, and a resident of Grand Rapids, in the county of Kent and State of Michigan, have invented an Improvement in Levels and Plumbs, of which the following is a specification.

This invention relates to improvements in levels and plumbs and more particularly to the class of spirit levels and plumbs.

The primary object of the invention is to construct an instrument of this character in which the level and plumb tubes or glasses are so arranged that either edge of the device may be used in order to secure a proper level and either end may be employed to ascertain the correct position of a given object.

In carrying out the foregoing object, the invention comprises preferably a body portion provided centrally with a series of adjacent openings in which are mounted a plurality of spirit tubes which are carried in metal casings, which serves the purpose of protecting said tubes from breakage. In one of the said openings in the body portion a series of tubes are mounted, some of which extend longitudinally of the body portion and parallel to the edges thereof, while the others extend transversely of the body portion and parallel to the ends thereof. The first-named tubes are arranged so that either edge of the instrument may be used for determining a level, while the last-named tubes are arranged so that either end of the instrument may be employed for plumbing. In addition to these spirit tubes, the other openings in the body portion each have mounted therein a spirit tube in the form of a "double crown" glass, whereby the bubble in the tube is visible from either side of the instrument. These latter tubes are also arranged transversely to each other in order that the device may be used either as a level or plumb.

A further object of the invention is to provide the body portion with a plurality of suitable compartments for the reception of small tools and other implements used in the carpenters' trade.

The inventive idea involved is capable of receiving a variety of mechanical expressions, one of which is shown in the accompanying drawings, in which; Figure 1 is a top plan view of the invention. Fig. 2 is an enlarged fragmentary longitudinal section on the line 2—2 of Fig. 1. Fig. 3 is a fragmentary perspective view of the closure for one of the compartments in the body portion. Fig. 4 is a cross section on the line 4—4 of Fig. 1. Fig. 5 is a cross section on the line 5—5 of Fig. 1. Fig. 6 is an end view of the device showing the compartments therein and the closure therefor. Fig. 7 is a section on the line 7—7 of Fig. 6. Fig. 8 is a detail perspective view of one of the casings for the spirit tubes and the means for securing said casing to the body portion.

Referring more particularly to the accompanying drawings in which like reference characters designate similar parts, the numeral 10 indicates the body portion of the device which is preferably elongated and made of a suitable material, such as wood. The body 10 is provided intermediate its ends with oppositely disposed cut-out portions 11 which form the abutment shoulders 12. This cut-out portion 11 is elongated and provided therein with a series of adjacent openings 13, 14 and 15, which extend transversely through the body portion.

The central opening 14 has secured to the longitudinal walls thereof, the oppositely disposed casings 16 which are arranged parallel to the longitudinal edges of the body portion 10. Each end of the casings 16 has secured thereto and extending transversely thereof, a cleat 17 having suitable openings 18 therein for the reception of screws 19, used for securing the casings to the walls of said openings. Similar casings are mounted in the opening 14 at right angles to the first-named casings and extending transversely of the body portion 10 but parallel to the ends thereof. Each of the casings mounted in the opening 14 is provided with sight openings 20, whereby the bubbles in the spirit tubes 21, which are carried in said casings, are visible. From this construction it is readily apparent that either longitudinal edge may be used in ascertaining the level or that either end of the body portion may be employed as a plumb.

The transverse opening 13 has mounted therein a spirit tube 24 composed of a "double" crown glass having its end rounded and suitably anchored in the body portion 10. The tube 24 is preferably oval in cross and longitudinal section and the single bubble moves to indicate a level when either edge of the instrument is used.

The transverse opening 15 in the body portion 10 has also mounted therein a spirit tube 27 similar in construction to the tube 24, whereby the bubble therein is visible from both faces of the instrument when either end thereof is used to ascertain the plumb of a certain object. In contradistinction, however, to the tube 24, the tube 27 extends transversely of the body portion 10 and parallel to the ends thereof whereby the same may be used as a plumb in the same manner as the spirit tubes 16 in the opening 14 which are parallel to the first-mentioned tube.

The ends of the openings 13, 14 and 15 each have transparent coverings 28 which abut the shoulders 12 of the cut-out portions 11 or the intermediate portions 29 between said openings, and are secured to the body portion by means of the small fasteners 30. These coverings 28 are preferably made in sections so that the same may be readily replaced should they become broken. The said coverings are further secured in position by means of the L-shaped strip 31, preferably of metal, which is also made in sections, as shown, so that the same may be readily removed in order to replace the broken covering. These strips are secured to the walls of the cut-out portions 11 by means of suitable fastenings 32.

The body portion 10 is provided adjacent one end thereof with an elongated compartment 33 having a metal back 34 secured to the body portion by means of screw fasteners 35. This compartment 33 is used for the reception of suitable tools and implements and is provided with a pivoted closure 36 hinged to the body portion 10 at 37. The closure 36 is provided on the underside thereof with a lug 38 to which is secured one end of a compression spring 39, the other end thereof being secured to a cleat 40 fastened to the wall of the compartment 33 by means of screws 41, the utility of said spring being to retain the cover 36 in a normally closed position.

The opposite end of the body portion 10 is also provided with a pair of longitudinally extending compartments 42 which are circular in cross section and arranged parallel to each other. These compartments are used for a similar purpose as the compartment 33. This end of the body portion has secured thereto a plate 43 having the openings 44 therein, which register with the ends of the compartments 42. The outer ends of said compartments are closed by means of a cover 45 which is pivoted to the body portion 10 at 46. The cover 45 is made of suitable resilient metal and is provided adjacent its free end with a stud 47 which is adapted to engage an opening 48 in the metal plate 43 when the cover is in a closing position.

From the foregoing description taken in connection with the accompanying drawings, it will be apparent that the invention provides an improvement in spirit levels and plumbs which may be readily manufactured at a minimum cost.

I claim:—

A device of the character described comprising a body portion having a continuous cut out portion in each face thereof and a plurality of openings in said body portion within the limits of said cut out portion, a plurality of spirit tubes in one of said openings, a similar tube in each of the other openings in said body portion and arranged transversely to each other, an individual transparent covering for each of said openings, and a substantially L-shaped strip for each covering removably secured to the walls of said cut out portions and adapted to detachably retain said covering in position.

CALVIN O. BOLTON.

Copies of this patent may be obtained for five cents each, by addressing the "Commissioner of Patents, Washington, D. C."